United States Patent
Zirwas

(10) Patent No.: US 10,098,024 B2
(45) Date of Patent: Oct. 9, 2018

(54) METHOD OF ACHIEVING INFORMATION, ACCESS NODE AND COMMUNICATION DEVICE

(75) Inventor: Wolfgang Zirwas, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 383 days.

(21) Appl. No.: 14/128,047

(22) PCT Filed: Jun. 22, 2011

(86) PCT No.: PCT/EP2011/060426
§ 371 (c)(1),
(2), (4) Date: Dec. 20, 2013

(87) PCT Pub. No.: WO2012/175121
PCT Pub. Date: Dec. 27, 2012

(65) Prior Publication Data
US 2014/0126407 A1    May 8, 2014

(51) Int. Cl.
*H04W 24/08*    (2009.01)
*H04B 7/024*    (2017.01)
*H04B 17/24*    (2015.01)
*H04B 17/373*   (2015.01)
*H04B 17/382*   (2015.01)

(52) U.S. Cl.
CPC ............ *H04W 24/08* (2013.01); *H04B 7/024* (2013.01); *H04B 17/24* (2015.01); *H04B 17/373* (2015.01); *H04B 17/382* (2015.01)

(58) Field of Classification Search
CPC ..... H04W 36/32; H04W 24/02; H04W 36/08; H04W 36/30; H04W 48/16; H04W 84/005; H04W 36/04
USPC ........... 455/115.1, 522, 238.1, 441; 370/328, 370/252, 329
See application file for complete search history.

(56) References Cited

U.S. PATENT DOCUMENTS

| | | | |
|---|---|---|---|
| 7,072,669 B1 * | 7/2006 | Duckworth | G01S 5/0215 455/404.2 |
| 7,536,186 B2 * | 5/2009 | Dorenbosch | H04W 36/04 370/331 |
| 8,542,186 B2 * | 9/2013 | Alameh | G06F 1/1694 324/115 |
| 8,810,451 B2 * | 8/2014 | Xie | H01Q 1/125 342/359 |

(Continued)

FOREIGN PATENT DOCUMENTS

| EP | 2 099 140 A1 | 9/2009 |
|---|---|---|
| WO | WO2010/081535 A1 | 7/2010 |

OTHER PUBLICATIONS

3GPP TS 36.300 V8.0.0 (Mar. 2007); "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; 82 pgs.

*Primary Examiner* — Wutchung Chu
(74) *Attorney, Agent, or Firm* — Harrington & Smith

(57) ABSTRACT

A method of achieving information associated with sensor data in a communication network including a plurality of communication devices is provided, wherein the method includes receiving a signal at a first communication device, wherein the received signal is associated with sensor data measured by a sensor of a second communication device.

15 Claims, 1 Drawing Sheet

(56) References Cited

U.S. PATENT DOCUMENTS

| | | | |
|---|---|---|---|
| 8,934,369 B2* | 1/2015 | Cao | H04W 36/0083 370/252 |
| 9,078,090 B1* | 7/2015 | Shahmoon | H04W 4/02 |
| 9,420,527 B2* | 8/2016 | Falconetti | H04W 28/0215 |
| 9,497,639 B2* | 11/2016 | Meshkati | H04W 24/02 |
| 9,766,788 B2* | 9/2017 | Kerr | G06F 3/04842 |
| 2004/0029558 A1* | 2/2004 | Liu | G01S 5/02 455/404.2 |
| 2004/0147264 A1* | 7/2004 | Ogawa | H04W 36/30 455/441 |
| 2004/0185870 A1* | 9/2004 | Matsuda | H04W 64/00 455/456.1 |
| 2005/0048977 A1* | 3/2005 | Dorenbosch | H04W 36/04 455/441 |
| 2005/0181799 A1* | 8/2005 | Laroia | H04B 17/24 455/450 |
| 2007/0057843 A1 | 3/2007 | Chang et al. | 342/368 |
| 2007/0115796 A1* | 5/2007 | Jeong | H04L 1/0026 370/203 |
| 2007/0121538 A1* | 5/2007 | Ode | H04L 5/0048 370/323 |
| 2009/0225716 A1* | 9/2009 | Chen | H04B 7/0689 370/329 |
| 2010/0208699 A1* | 8/2010 | Lee | H04W 36/0055 370/331 |
| 2011/0059748 A1* | 3/2011 | Taylor | H04W 4/02 455/456.1 |
| 2011/0263242 A1* | 10/2011 | Tinnakornsrisuphap | H04W 36/04 455/422.1 |
| 2012/0056784 A1* | 3/2012 | Xie | H01Q 1/125 342/359 |
| 2012/0064841 A1* | 3/2012 | Husted | H01Q 21/205 455/78 |
| 2012/0071151 A1* | 3/2012 | Abramson | H04L 67/12 455/418 |
| 2012/0083285 A1* | 4/2012 | Shatsky | G01S 19/48 455/456.1 |
| 2012/0094666 A1* | 4/2012 | Awoniyi | H04W 48/16 455/435.1 |
| 2012/0120922 A1* | 5/2012 | Huang | H04W 36/24 370/332 |

* cited by examiner

METHOD OF ACHIEVING INFORMATION, ACCESS NODE AND COMMUNICATION DEVICE

FIELD OF INVENTION

The present invention relates to a method of achieving information associated with sensor data of a communication network. In particular the communication network may be a mobile communication network. Furthermore, the invention relates to an access node or stationary communication device, a communication device and an interface for a communication network. Additionally, the invention relates to a protocol usable for performing communication in a communication network.

ART BACKGROUND

The invention is related to the field of communication networks, e.g. mobile radio system concepts like LTE, LTE-A and its evolution, possibly dealing as one example with the case of joint precoding coordinated multi point (JP-CoMP) transmission.

One important aspect of CoMP is accurate channel estimation and in this context channel prediction is relevant as well. In WO 2010/081535 A1 a model based channel prediction and feedback scheme has been proposed. It uses location feedback instead of e.g. preferred matrix indications (PMI) to find the optimum precoder. In particular, the described teaching relates to a method of operating a user equipment in order to enable a network element to determine channel state information (CSI) of a communication channel between the UE and the network element. The method comprises determining a location of the UE, and transmitting the location of the UE to the network element.

For model based channel prediction a very specific solution has been proposed, namely to feedback a 3 dimensional location information instead of preferred matrix indications (PMI)—relative to a model known by UEs as well as enhanced NodeB (eNB or eNodeB). In combination with a moving vector a channel prediction is possible and it is even possible (at least theoretically) to predict death and birth of new radio channel components.

A different area might be cooperative transmission on the backhaul link of relay networks. Relay nodes (RN) have the benefit that they are fixed and therefore channel estimation is significantly relaxed allowing with less overhead for reference signals (RS) higher accuracy.

SUMMARY OF THE INVENTION

However, there may be a need to provide a method of or a device for achieving information which may be usable to improve the estimation and/or prediction of channel performance.

This need may be met by a method of achieving information associated with sensor data of a communication network, an access node or stationary communication device, an interface, a communication protocol, a program element and a computer readable medium according to the independent claims. Further embodiments are described in the dependent claims.

According to an exemplary aspect there is provided a method of achieving information associated with sensor data in a communication network including a plurality of communication devices, wherein the method comprises receiving a signal at a first communication device, wherein the received signal is associated with sensor data measured by a sensor of a second communication device.

In particular, the communication network may be a mobile communication network, e.g. an LTE network or an LTE-A network. For example, the first communication device may be an access node or a stationary communication device or network element of a communication network, e.g. a base station or a relay node. The second device may be a user equipment, e.g. a mobile phone, a PDA, a laptop or the like. However, the second device comprising a sensor may also be a stationary device, e.g. a relay node, a pico stations or the like. In particular, it should be mentioned that the term communication device may as well encompass devices which are not involved in the communication link for payload data but may be general devices of the communication network. For example, the second communication network may be stationary and may include as a sensor a camera which is adapted to take images of another communication device, e.g. of a relay node, a user equipment or the like. However, this second network may be for example a fixed video camera as it is used for monitoring streets, buildings, stations or places.

In particular, the signal may be sent, e.g. directly or indirectly, to the first communication device and/or may be broadcasted by the second communication device.

In particular, the term "sensor" may denote a measuring device or unit adapted to measure a value of a physical parameter. Examples for a physical parameter may be acceleration, rotation, velocity and/or direction of a movement, orientation, acoustic pressure, or the like. Even an image may represent sensor data in the sense of this application. That is, the term "sensor" may denote any measuring unit measuring a physical parameter which is associated with or which describes a communication device. However, the physical parameter has to be distinguished from the signal strength of a communication link used to transmit payload data in the communication network, since the signal strength does not describe the communication device but a respective communication link. For example, the term "sensor" may therefore not denote an antenna. That is, according to the present teaching an antenna receiving a communication signal, either from another communication device or from GPS satellites, is no "sensor" in the meaning of this application. In particular, the term sensor may thus not denote a measuring device measuring the value of a physical parameter of the transmitted signal, e.g. the signal strength of a communication signal, but another physical parameter which may influence the signal strength directly or indirectly. Consequently, the term "sensor data" may particularly denote data which are indicative or are associated with the measured value of a physical parameter which is measured by the sensor. In particular, the sensor data may be embodied by an electrical or electromagnetic signal, e.g. by a digital or analog signal which may be transmittable by a communication device of a communication network.

According to an exemplary aspect there is provided an access node or stationary communication device for a communication network comprising a plurality of communication devices,
    wherein the stationary communication device is adapted
        to receive a signal associated with sensor data measured by a sensor of a further communication device of the plurality of communication devices.

In particular, the access node or stationary communication device or network element may be an eNodeB, a base station, a relay node, a pico station, a femto station, or the like. Such a stationary communication device may particularly comprise an antenna portion and/or a processing unit.

According to an exemplary aspect there is provided a communication device for a communication network comprising a plurality of communication devices, wherein the communication device comprises a sensor adapted to measure sensor data indicative of a value of a physical parameter, and wherein the communication device is adapted to send a signal to a further communication device of the communication network wherein the signal is associated with the measured sensor data.

In particular, the sensor may be or may include an acceleration sensor or rotation sensor, a photo sensor, a camera, a video camera, a microphone, a laser or laser sensor, or the like. By using acceleration or rotation sensors it may be possible to take into account also fast rotational movements of the communication device, e.g. a mobile UE for calculations, determinations or estimations for parameters which may influence the transmission of payload data in the communication network, e.g. the channel performance. While linear movements can be predicted comparable easily, device rotations of the UE antennas—e.g. due to a person rotating its head or unpredictable movements of the hand holding the device—may be much more difficult to predict. In combination with directivity of the UE antennas a rotation might change radio conditions within a very short time significantly. The reason may be that at a certain Rx-point there will be completely or partly different multi path components depending on the angle of arrival.

The communication device comprising the sensor may be either a mobile device, e.g. a UE or mobile phone or mobile computer, or may be a stationary communication device as well, e.g. a relay node (RN). Such a relay node may, although stationary in principle, be subjected to some movement. For example, typical locations for RNs may be lamp posts and these have a height of several meters. In case of strong wind they tend to swing by several cm, which may be sufficient to fully change the radio conditions. The situation of the mechanical swinging RNs could benefit of the feedback of acceleration sensors, which may allow calculating the current relative location of the RN.

Thus, both types of communication device, i.e. UEs and RNs, may benefit from more information of current movements of the respective UEs or the RNs.

According to an exemplary aspect there is provided an interface for a communication network comprising a plurality of communication devices, wherein the interface is adapted to transceive a signal associated with sensor data measured by a sensor of one communication device.

The term "transceive" may particularly include transmitting and/or receiving a signal. In particular, the interface may be a standardized low latency interface and/or may implement a predefined timing exchange of sensor data and/or may implement a wireless (over the air) or wired connectivity.

According to an exemplary aspect there is provided a communication protocol, wherein the communication protocol is adapted to support a message format including sensor data That is, the communication protocol may correspond or support corresponding message formats which are adapted to include sensor data in the above described sense. The new message formats may allow for flexible setup of reporting modes from UE to eNBs like one time versus regularly, with or without fixed delay, with or without low latency, with or without specific time stamps etc. depending on the sensor information or sensor data and the intended application.

Furthermore, the message formats may be suitable for robust and low overhead reporting. Low overhead and low latency may need specific control channels fully integrated into the LTE control channels. Reporting over IP based applications may be not sufficient for the high end solutions due to delay variations and large overhead for IP headers.

For regular and high accuracy reports specific compression schemes like lossless compression or robust tracking schemes might be of interest. But generally the data rate for sensor information or sensor data may be expected to be low. Typical reporting rates might be in the range of 10 to several 10-th of ms with about 5-10 bit per report. In that case the net reporting rate would be well below 1 kbit/s.

The relative processing time for sensor data—i.e. the time between the measurement of a sensor and the time as it is processed within the UE—may be another important parameter to be standardized or to be reported by UEs to the eNB so that the eNB can estimate the current state of the UE taking the processing delay into account.

According to an exemplary aspect of the invention a program element is provided, which, when being executed by a processor, is adapted to control or carry out a method according to an exemplary aspect of the invention.

According to an exemplary aspect of the invention a computer-readable medium, in which a computer program is stored which, when being executed by a processor, is adapted to control or carry out a method according to an exemplary aspect of the invention.

By performing the method according to an exemplary aspect it may be possible to make available measurement results of specific sensors, which are increasingly implemented in new smart phones or mobile phones, for additional processes or usages, e.g. for improving channel predictions, handover processes, scheduling processes or the like. It should be mentioned that the (communication) channel may be a wireless communication channel, e.g. a communication channel of a cellular communication network. However, according to other embodiments, other channel types, such as a wired communication channel, are also possible. The specific sensors may include specific sensors to detect the orientation of a mobile device or use acceleration detectors to calculate rotations or other device movements. These detectors may typically be micro mechanical devices being at the same time very small, accurate and low cost.

Thus, by meeting the above defined need it may be possible also to improve, as one example, model based channel estimation based on location feedback by combining it with UE based sensor data to provide otherwise impossible solutions. Thus, further applications, e.g. for optimized scheduling or resource management, might be based on increasingly better knowledge of sensor data.

Summarizing a gist of an exemplary embodiment may be seen in the fact to exploit the general trend to more complex and intelligent radio systems for enabling an improved communication in a communication network. In particular, the trend to more complex and intelligent radio systems may be founded on several reasons: i) the processing capabilities and of size memories at UEs as well as eNBs are increasing, ii) at link level today's systems gets to their theoretical optimum requesting for more advanced and intelligent solutions for HO, scheduling, RRM etc. As one example one may see the trend to self optimizing networks (SON) providing more and more self optimizing capabilities. As a consequence knowledge about the surrounding of an eNB or pico stations may increase more and more in the future making more profound decisions possible, e.g. with respect to finding optimum handover targets or scheduling decisions.

It should be mentioned that the providing of specific sensor data forming feedback data and being indicative of acceleration and/or rotation for example, has to be distinguished from processed location data or known surrounding data. While the sensor data according to this application may be data which are measured by specific sensors associated with a communication device, e.g. a user equipment (mobile phone or smart phone, or the like), the location data may be data which relate only to the position of the user equipment and may be determined by a GPS system, for example. It should be noted that according to this application the term "sensor" does not include antennas receiving signals, e.g. payload data received from another communication device or GPS signals received from the respective satellites. Surrounding data on the other hand relate to data of the surrounding environment already known to the eNodeBs by stored maps which are associated to its position and which are not measured by any sensor associated with a communication device. In particular, in the prior art no option exists to transfer device specific sensor data like rotation or acceleration information from UEs to eNBs.

Next exemplary embodiments of the method are described. However, these embodiments also apply to the access node or stationary communication device or network element, the communication device, the interface, the communication protocol, the program element and the computer readable medium.

According to an exemplary embodiment the method further comprises estimating a channel performance taking into account the measured sensor data.

In particular, the channel estimation may be performed at the first communication device and/or at the second communication device. In case the channel estimation is performed at the first communication device, e.g. a base station or NodeB, the signal which is received at the first communication device may be the measured sensor data. In case the channel estimation is performed at the second communication device, the signal received at the first communication device may already be the channel estimation or at least some pre-processed data. The estimation of the channel performance may include a channel prediction. The signal may comprise the sensor data in a compressed or uncompressed way. In this sense the signal may be a compressed signal or an uncompressed signal.

According to an exemplary embodiment the method further comprises modifying a communication link between the second communication device and the first communication device based on the estimated channel performance.

The term "modifying a communication link" may be interpreted in a broad sense and may encompass modifying or altering of any parameter influencing a communication between two communication devices in the communication network. Examples may be the performing of a hand over operation, the performing of switching a communication channel, increasing/decreasing signal strength of a communication signal, e.g. including payload data, sent by any of the involved communication devices.

According to an exemplary embodiment the method further comprises sending a request message for sensor data.

In particular, the request message may be sent from the first communication device to the second communication device. For example, the request may be sent only once or may be sent on a regular basis. In particular, the receiving of a single request message may trigger a single sending of the signal associated with the measured sensor data or may trigger a regular sending, e.g. at a predetermined time interval between the regular signal transmissions or receivings at the first communication device. The predetermined time interval or timing may be defined by the first communication device or network element, e.g. an eNodeB. Additionally, the request message may also define the kind of sensor data which is requested, e.g. the request message may define that sensor data of an acceleration sensor or of a rotation sensor or of an acoustic sensor has to be sent.

In particular, the request message may be sent from an eNodeB to a user equipment or to a relay node. Alternatively, the request message may be sent from a relay node or a pico station to the second communication device, e.g. a user equipment. In particular, the request message may request for specific sensor data, e.g. for sensor data indicating a rotation and/or acceleration of the communication device, e.g. user equipment, the sensor data are related to.

Next further exemplary embodiments of the access node or stationary communication device are described. However, the embodiments also apply to the method of achieving information associated with sensor data, the communication device, the interface, the communication protocol, the program element and the computer readable medium.

According to an exemplary embodiment of the stationary communication device the stationary communication device is further adapted to perform a channel estimation based on the received signal associated with sensor data.

According to an embodiment, the stationary communication device or network element may be a base station of a communication network, e.g. of a cellular communication network, e.g. an enhanced NodeB (eNB or eNodeB). According to a further embodiment, the stationary communication device as defined herein may at least include part of a controller of a base station of a communication network. According to a further embodiment, the network element or communication device as defined herein includes a base station of a communication system or communication network and at least part of its controller. According to an embodiment the communication system may be a cellular or mobile communication system or network. According to a further embodiment, the controller of the base station may be a radio network controller (RNC). In particular, the stationary communication device or network element and the UE may be part of a cooperative antenna system (COOPA). In this case, feeding back of the sensor data of the second communication device, e.g. UE, may result in an even higher efficiency due to the higher number of radio channels for which the respective sensor data may be used, e.g. for estimating a channel performance or channel state information.

In case the sensor data relate to the physical parameter acoustic pressure, i.e. are taken by a microphone or the like, the stationary communication devices, e.g. the eNBs, might use acoustic information provided by the mobile's microphone of a set of active users as further source of information. In case several active users are present in relative close distance, acoustic information (different delays, amplitudes of different UEs, different frequency selective damping of the acoustic waves etc. for different acoustic events like speech or car noise) might allow to scan the mobile phones environment similar as being done by the ears of human beings and to learn e.g. movements of a nearby person.

Next further exemplary embodiments of the communication device are described. However, the embodiments also apply to the method of achieving information associated with sensor data, the access node or stationary communication device or network element, the interface, the communication protocol, the program element and the computer readable medium.

According to an exemplary embodiment of the communication device the communication device is adapted to receive a request message requesting for the sensor data. Furthermore, the communication device may further be adapted to send the signal in response to the receiving of the request message.

In particular, the communication device may be adapted in such a way that the measurement of the sensor is triggered by the request message. Alternatively or additionally the measurement may be performed on a regular or at least self triggered basis and the request message may be just triggering the sending, transmission or broadcasting of the signal.

According to an exemplary embodiment the communication device is a relay node of the communication network and the sensor is an acceleration sensor. Alternatively or additionally to the acceleration sensor some specific laser sensors estimating the RN location with respect to a nearby fixed reflector may be used.

For example, typical locations for RNs may be lamp posts having a height of several meters. In case of strong wind they tend to swing by several cm, which may be sufficient to fully change the radio conditions. In the situation of the mechanical swinging RNs the communication performance in the communication network could benefit of the feedback of acceleration sensors, which may allow calculating the current relative location of the RN. For a swinging RN the same channel conditions may occur regularly (each RN position is related to a certain radio channel condition, being mostly time invariant) so that knowing the current position of the RN may often be sufficient to fully reconstruct the according radio channel. Therefore for swinging fixed RNs a regular single sensor feedback may be sufficient to fully reconstruct the radio channel, after the radio channel has been measured fully in a first setup phase. This may specifically be interesting for JP CoMP on RN backhaul links, between several RNs and their Donor eNBs (DeNBs), which may be advantageous in the so called Artist4G project, as a high number of radio channels will have to be estimated with high accuracy.

Summarizing an idea of an exemplary embodiment may be seen in the feedback of device specific sensor data, as current smart phones may have already available like acceleration or rotation information, over a low latency interface from UEs to eNBs or RNs. Such sensors are in the meantime quite accurate and sensitive and are being used e.g. for specific games or display adaptations.

Feeding back this information may provide the eNBs with additional otherwise not available and valuable information of current UE conditions, i.e. giving the eNBs a better view about its surrounding and the UEs within its cell, like the current antenna orientation as a simple example.

Having available these additional information or knowledge, e.g. UE rotations as they happen during a typical phone call, may be very helpful for the model based channel prediction. With such knowledge and in combination with an accurate building vector data model (BVDM) channel prediction based on the angular dependent appearance of new MPCs may be possible.

Another application which may be implemented may be an optimized handover e.g. to a nearby pico station as soon as the antenna pattern of an UE is directed to the pico station. Vice versa scheduling decisions might take care of UEs suddenly directing directly to a pico station or a RN thereby generating full blown interference for a short period of time.

In case the sensor data relate to RNs or pico stations these sensor data might be sent or broadcasted/multicasted—in addition to the feedback to the DeNB—to the UEs served by the RN or pico station (or even eNB) for a similar purpose, i.e. to estimate the channel variations due to the mechanical movements of the according radio station just from a single value.

Some basic ideas of an exemplary aspect may be seen in defining a specific new message format or a standardized communication protocol allowing to feedback any sensor information as being common for current or future smart phones, lap tops, PDAs or the like. A new UE to eNB interface may be standardized to allow for over the air, low latency, and with a predefined timing exchange of sensor data. Specific sensor data request messages may be defined, either requesting single or regular sensor data feedback with a timing to be defined by the eNBs, relay node, or another suitable communication device or network element. Further the message might allow defining the kind of sensor data, like device orientation or acceleration information. Additionally the format of the feedback may be specified, e.g. allowing for different formats for similar sensors but different device types e.g. from different vendors or manufacturers.

A general goal of exemplary embodiments may be to get as much additional information about the surrounding environment of a cell as possible for optimum processing or handover decisions. Beside acceleration or rotation sensor data other information or sensor data like pictures from video cameras may be used allowing the eNodeB to follow the movements of persons, for example. Nearby moving persons having similar height as a served UE may affect the channel conditions significantly. Knowledge of these persons and the direction of their movement may be extremely helpful and may be comparatively easily achievable in this way. In that sense the video cameras may be seen as very specific sensors for determining or measuring of sensor data in the sense of the present application. Naturally data privacy for the moving persons should be ensured, e.g. by automatic pixeling of heads as being done for Google street view. In case the video cameras are accessible over fixed networks additional over the air or wireless traffic may be avoided.

According to a further embodiment actual pictures from the mobile phone cameras may be transferred to provide information of the surrounding for a similar purpose as mentioned above.

It has to be pointed out that of course any combination of features relating to different aspects of the herein disclosed subject matter is also possible. In particular, some embodiments have been described with reference to apparatus type claims whereas other embodiments have been described with reference to method type claims. However, a person skilled in the art will gather from the above and the following description that, unless other notified, in addition to any combination of features belonging to one aspect also any combination between features relating to different aspects or embodiments, for example even between features of the apparatus type claims and features of the method type claims is considered to be disclosed with this application.

The aspects defined above and further aspects of the present invention are apparent from the examples of embodiment to be described hereinafter and are explained with reference to the examples of embodiment. The inven-

DETAILED DESCRIPTION

Figure 1:
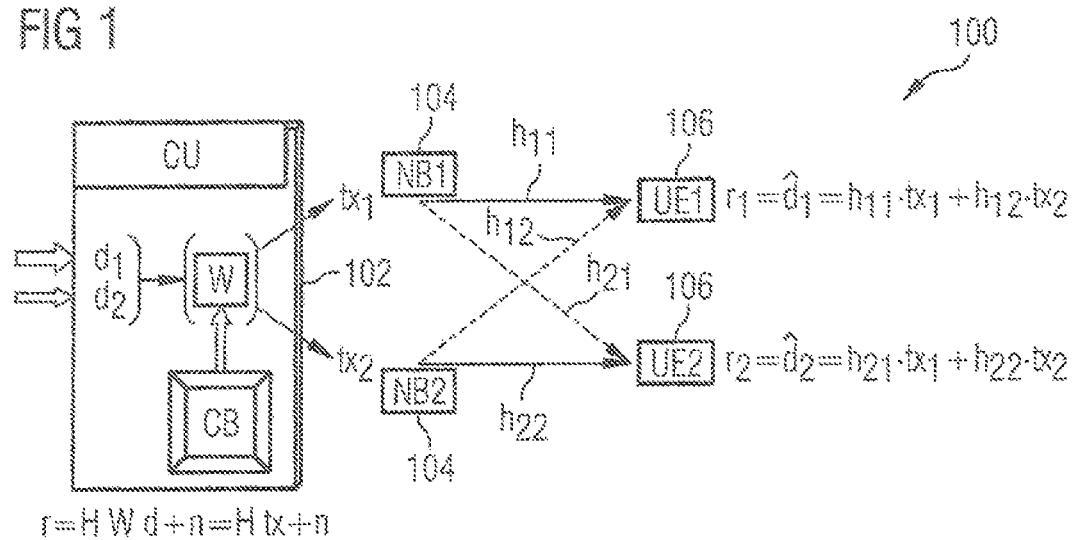
FIG. 1 shows a communication system having basic components of a cooperative transmission (COOPA) system.

The illustration in the drawings is schematic. It is noted that in different figures, similar or identical elements are provided with the same reference signs or with reference signs, which are different from the corresponding reference signs only within the first digit.

For cellular systems like 3GPP LTE (3GPP=Third generation partnership project; LTE=long term evolution; see 3GPP TS 36.300v800, March 2007) some form of cooperative antenna systems (COOPA) has been proposed to overcome inter cell interference and to exploit improved radio channels (rank enhancement).

From theory significant performance gains with respect to capacity and coverage are known for full cooperating cellular radio systems compared to conventional ones. Due to these large gains, which cannot be achieved with other technologies, as it is known from theory that cooperative antenna systems provide an upper bound for interference limited cellular radio systems, makes it very likely that some type of cooperation will have to be implemented in future radio systems.

FIG. 1 shows a communication system 100 having basic components of a cooperative transmission (COOPA) system. Different types of cooperative antenna systems (COOPA) have been proposed in the meantime, but a so called cooperation area (CA), consisting of two cooperating eNBs and two UEs as illustrated in FIG. 1, is the basis of any COOPA system.

The central unit (CU) 102 of a CA performs common signal precoding, which is basically a matrix multiplication of all data signals d1, d2 with a precoding matrix W resulting in transmit signals tx1 and tx2 which are provided to the network elements (NB1 and NB2) 104, respectively. In case of zero forcing (ZF) W is the pseudo inverse $H^+$ of the overall channel matrix H. The simplest form of a CA for a codebook based precoding is illustrated in FIG. 1. In this case the precoding matrix W is selected from a codebook CB based on the estimated radio channels between all involved UEs 106 and eNBs 104, e.g. using UL-DL reciprocity for TDD systems or by using explicit signalling by the UEs UE1 and UE2. Generally the vector of receive signals r (having components r1 and r2 in the example of FIG. 1) are obtained by $r=HWd+n=Htx+n$, where H is the channel matrix, including the components h11, h12, h21 and h22 in the example of FIG. 1, W is the precoding matrix;

d is the data vector, including the components d1, d2 in the example of FIG. 1; and n is a noise vector describing the noise of the system.

The optimal precoder is calculated as a function of the channel state information (CSI). However, since CSI is in general only available at the receiver (UE1, UE2), it needs to be fed back to the transmitter (NB1, NB2, CU). Especially for higher number of eNBs and UEs—each having several antenna elements—the number of radio channels, which have to be estimated and fed back from UEs to eNBs might be quite large, resulting in accordingly high feedback overhead.

According to an embodiment shown in FIG. 1, FDD systems are assumed, requiring explicit feedback of DL CSI, but TDD systems may also benefit in case of reciprocity errors, specific interference conditions or in case of small/no UL data traffic. Feedback overhead can be seen as one of the main challenges for COOPA systems and requires therefore special attention.

Channel estimation for broadband mobile radio systems is generally a challenge due to a large time variance and frequency selectivity of the radio channels in case of fast moving UEs. In case of COOPA systems, where a coherent precoding of data signals from different transmission sites is intended the challenge is even higher due to the higher number of radio channels as well as the required high accuracy with respect to the CSI estimates.

In frequency division duplexing (FDD) systems—under the assumption of a proper CSI estimation based on reference signals (RS) at the UEs—there is the requirement to feed back this CSI information from all UEs to all eNBs. Depending on the mobile speed this feedback will have to be updated regularly and quite often, leading to a high feedback data rate.

As additional drawback, feedback of CSI information might take several subframes, i.e. there will be typically a latency of few to several ms, leading to outdated channel information at the eNBs. This might result in significant performance degradation in COOPA systems due to outdated precoding matrices W.

Generally herein, a novel and extremely powerful technique will be proposed, promising a significant further reduction over conventionally known feedback reduction schemes.

A basic idea of the herein disclosed subject matter is to feed back from UE to the network elements (eNBs) instead of the radio channel itself accurate sensor data associated with physical parameters which may influence the channel between a UE having the respected sensor associated therewith and the network element or communication device.

Figure 2:
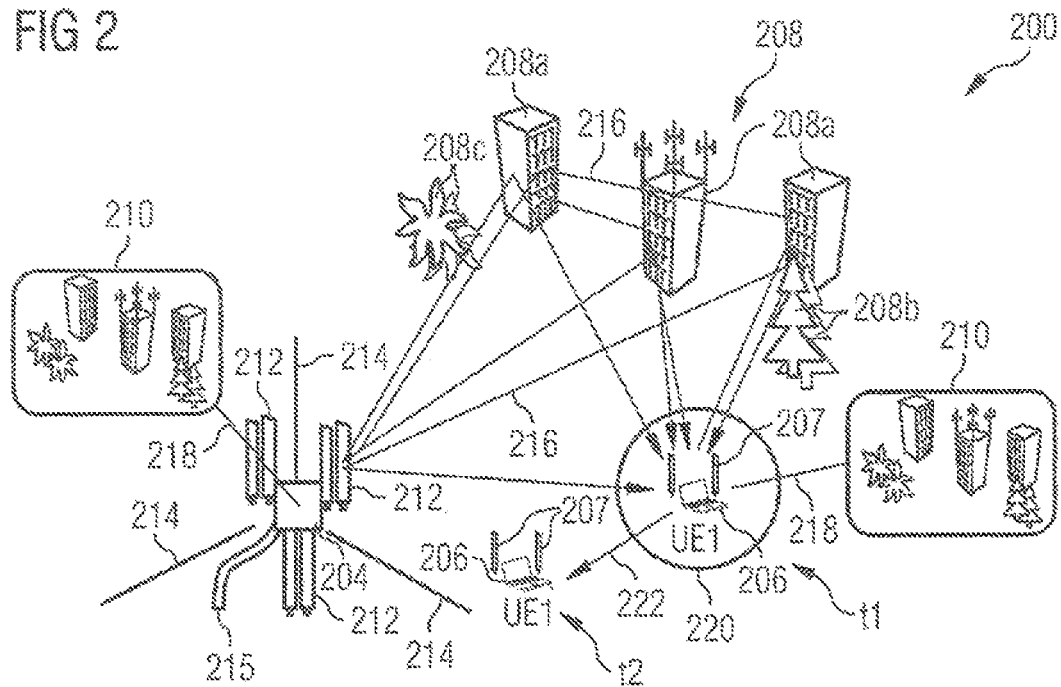
FIG. 2 shows a communication system according to illustrative embodiments.

FIG. 2 illustrates a communication system 200 in accordance with illustrative embodiments of the herein disclosed subject matter. Of the communication system 200 of FIG. 2, one network element 204 in the form of an eNodeB (eNB) and one user equipment 206 (UE1) is shown. Antenna elements of the UE1 are indicated at 207. The exemplary eNB 204 comprises three antenna sets 212, one for each sector associated with the eNB 204. Sector boundaries of the sectors are indicated at 214 in FIG. 2. However, other configurations are also possible. Typically an eNB communicates with radio network controllers and/or other eNBs via communications lines, indicated at 215 in FIG. 2. As eNBs are located at fixed positions, i.e. stationary, they can easily have a perfect knowledge of their surrounding 208, e.g. accurate 3D vector building data of all surrounding buildings 208a as well as trees 208b or other fixed obstacles 208c.

In case the location of an UE 206 together with the building vector data 210 is known by the eNB 204 it can easily calculate an estimated overall resulting channel impulse response by well known raytracing algorithms. Although the antenna pattern of the UE 206 should be known in principle, it may easily change due to rotation of the UE 206 during a phone call for example. The same may hold true for a relay node, which is fixed to a lamp post, due to strong winds.

Thus, an antenna or radiation pattern of the UE 206, which may be sent, e.g. during connection setup, by a pattern indicator, e.g. in the form of a respectively designed software module, may rapidly change. Indicating the antenna pattern to the eNB 204 may be performed e.g. by transmitting a respective message to the eNB 204.

Thus, it may be advantageous that the UE feeds back, additionally to moving vector (MV) information, acceleration or rotation data, i.e. sensor data, so that the eNB will be able to perform a prediction of the radio channel over a larger time period. Such a moving vector may also include or depend on the sensor data. Since acceleration or rotation may strongly influence the radiation pattern of an antenna of the UE and thus channel performance, the including of such sensor data may significantly improve channel prediction and consequently the future communication performed by the respective UE.

A challenge is the accurate estimation of the UE position, which has to be a fraction of a wavelength of the RF frequency. In case of a 2.6 GHz frequency the wavelength $\lambda$ is just 0.11 meters (m). If the maximum phase error should be smaller than 5° this will require a location accuracy of less than 0.0016 meters or 1.6 millimeters (mm). GPS based location will be typically worse to that and other well known location algorithms will have even worse performance.

For that reason it is proposed to combine GPS based localisation with a ray tracing based method using the 3D vector building data as mentioned above. The overall solution, according to embodiments, is illustrated in FIG. 2 and contains the following steps:

a) in first step the eNB broadcasts 3D local building vector data map 210 (BVDM) of its surrounding as a combination of measured pre stored data and adaptive learning corrections in regular manner, e.g. every second. The adaptive learning corrections are e.g. done based on the UE feedbacks and take care of varying car traffic, varying foliage conditions in different seasons etc.

b) All UEs receive and store this local BVDM. Lines 218 in FIG. 2 indicate that the BVDM 210 is stored in the UE 206 as well as in the eNB 204. While UEs move they may add further BVDMs from other eNBs, thereby enlarging their overall view of their surrounding. Similar to navigation systems these 3D building vector data might be also loaded into the UE in advance e.g. based on a CD or over an internet access.

c) as in conventional systems the eNB broadcasts common reference signals RSs.

d) Based on the common RSs the UEs estimate the CSI evolution over time.

e) Based on GPS the UE 206 places itself in an area 220 of the BVDM, defining a coarse position of the UE 206, e.g. with an accuracy of 10 m×10 m.

f) The UE 206 compares the estimated CSI with that of a raytraced CSI and determines the location within the 10×10 m² area where the mean square error (MSE) between estimated and calculated power delay profiles (PDPs) is minimized. For this calculation the UE includes its known effective antenna pattern. For this purpose the UE might perform a raytracing on a grid of possible locations and selects in the end the one with the smallest MSE deviation. But this leads probably to a large processing overhead. More directly will be the calculation based on the main paths of the channel impulse response. As the main location is already known it is possible to identify the main multipath components, some of which are indicated at 216 in FIG. 2 and its reflections at the surrounding, e.g. the buildings 208a. Delay differences between the estimated and the measured path delays allow directly calculating the correct position.

g) The UE 206 feeds back the best fitting UE position as calculated above. Nearby located persons might lead to additional shadowing effects and inaccuracies of the reflection model might lead to further deviations of the location based estimate of the CSI with that of the really measured CSI. For that reason it is proposed to send additionally difference data, e.g. delta CSI information dCSI, concerning e.g. moving objects not included in basic BVDM. The eNB can take this information additionally to update its BVDM map, so that dCSI might be reduced in the future.

h) Additionally the UE 206 feeds back the best fitting moving vector 222, containing estimated speed and direction, derived from the evolution of the CSI over the past. As typical movements of a UE can be seen as a series of piecewise linear movements and the linear movement will be typically quite large compared to a subframe length, this embodiment of prediction promises significant feedback reduction. In FIG. 2, the UE 206 is shown in at two different times, indicated at t1 and t2, wherein the movement is described by the moving vector 222.

i) The eNB 204 recalculates the CSI and its evolution (prediction for long time periods) as seen by the UE based on fed back UE position, BVDM model, on the moving vector and on dCSI.

j) Based on many dCSI feedback the eNB 204 can optimize its BVDM model.

k) As a further improvement the eNB 204 may use the UL channel for estimation of further UE movements and combine this with its prediction from i). This improves CSI estimation accuracy as well as allows increasing the possible prediction time.

For further improving the above described scheme sensor data indicating an acceleration or orientation of a UE, e.g. a mobile phone or smart phone, may be helpful. These sensor data may be requested by an eNB of the communication network or communication system. The benefit of the proposed scheme—i.e. allowing eNBs to request device specific sensor information like UE orientation or acceleration—may be additional information for eNB decisions like handover or scheduling decisions. Further rotation information may allow extending the applicability of model based channel prediction. Generally these sensor information or sensor data might be very valuable as similar information is difficult to achieve otherwise.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

Further the examples and embodiments should not be construed as limiting the scope of the claims. Further, many variations are possible without leaving the scope of the appended claims.

LIST OF REFERENCE SIGNS 100, 200 communication network
102 central unit
104, 204 network element
106, 206 user equipment (UE)
208a building 208b tree
208c fixed obstacle
210 surrounding data
212 antenna set
214 sector boundary
215 connection
216 multipath component
218 indication for "stored in"
220 area of coarse position
222 moving vector

The invention claimed is:

1. A method comprising:
receiving a signal at a first communication device in a communication network comprising a plurality of communication devices;
determining information from the received signal, wherein the determined information is associated with orientation sensor data or rotation sensor data measured by a sensor of a second communication device;
deciding to modify a communication link between the second communication device and the first communication device depending on the determined information wherein modifying a communication link comprises a handover process.

2. The method according to claim 1, further comprising: performing a channel estimation based on the determined information.

3. The method according to claim 1, further comprising: sending a request message for the orientation sensor data or the rotation sensor data; and
wherein the received signal is in response to the sending of the request message.

4. A computer-readable product embodied on a non-transitory computer-readable medium, in which a computer program is stored which, when being executed by a processor, is adapted to provide instructions comprising to control or carry out the method according to claim 1.

5. The method according to claim 2, wherein modifying a communication link further comprises a scheduling process.

6. The method according to claim 2, further comprising: determining antenna orientation based on the received signal of orientation sensor data or rotation sensor data; and
wherein deciding to modifying a communication link is based on the determined antenna orientation.

7. The method according to claim 2, further comprising: estimating the angle of arrival of at least one multipath component based on the received signal of orientation sensor data or rotation sensor data.

8. An access node for a communication network comprising a plurality of communication devices, comprising at least one processor and at least one memory including computer program code, wherein the at least one memory and the computer code are configured, with the at least one processor; to cause the apparatus to at least perform the following:
receiving a signal associated with a communication device of the plurality of communication devices;
determining information from the received signal, wherein the determined information is associated with orientation sensor data or rotation sensor data measured by a sensor of the communication device;
deciding to modify a communication link between the second communication device and the first communication device depending on the determined information wherein modifying a communication link comprises a handover process.

9. The access node according to claim 8, wherein the at least one memory and the computer code are configured, with the at least one processor, to cause the access node at least further to perform a channel estimation based on the determined information.

10. The access node according to claim 9, wherein to modify a communication link further comprises a scheduling process.

11. The access node according to claim 9, wherein the at least one memory and the computer code are configured, with the at least one processor, to further cause the access node to determine antenna orientation based on the received signal of orientation sensor data or rotation sensor data; and wherein to decide to modify a communication link is based on the determined antenna orientation.

12. The access node according to claim 9, wherein the at least one memory and the computer code are configured, with the at least one processor, to cause the access node at least further adapted to estimate the angle of arrival of at least one multipath component based on the received signal of orientation sensor data or rotation sensor data.

13. A communication device for a communication network comprising a plurality of communication devices, the communication device comprises:
a sensor adapted to measure orientation sensor data or rotation sensor data indicative of a value of a physical parameter,
at least one processor and at least one memory including computer program code, wherein the at least one memory and the computer code are configured, with the at least one processor, to cause the apparatus at least to
send a signal to a further communication device of the communication network wherein the signal is associated with the measured sensor data; and
receive, as a consequence of the sending associated with the sensor data, a signal from the further communications device, wherein the signal is associated with a handover process.

14. The communication device according to claim 13, wherein the at least one memory and the computer code are configured, with the at least one processor, to further cause the communication device at least to receive a request message requesting for the orientation sensor data or the rotation sensor data, and to send the signal in response to the receiving of the request message.

15. The communication device according to claim 13, wherein the communication device is a relay node of the communication network, and
wherein the sensor is an acceleration sensor.

* * * * *